United States Patent
Conlon

(10) Patent No.: US 10,473,029 B2
(45) Date of Patent: Nov. 12, 2019

(54) LIQUID AIR POWER AND STORAGE

(71) Applicant: William M. Conlon, Palo Alto, CA (US)

(72) Inventor: William M. Conlon, Palo Alto, CA (US)

(*) Notice: Subject to any disclaimer, the term of this patent is extended or adjusted under 35 U.S.C. 154(b) by 731 days.

(21) Appl. No.: 14/546,406

(22) Filed: Nov. 18, 2014

(65) Prior Publication Data

US 2015/0184590 A1    Jul. 2, 2015

Related U.S. Application Data

(60) Provisional application No. 61/921,837, filed on Dec. 30, 2013.

(51) Int. Cl.
*F02C 6/16* (2006.01)
*F02C 3/22* (2006.01)
(Continued)

(52) U.S. Cl.
CPC ............ *F02C 6/16* (2013.01); *B01D 7/00* (2013.01); *F01K 23/10* (2013.01); *F02C 3/22* (2013.01); *F02C 6/14* (2013.01); *F25J 1/0012* (2013.01); *F25J 1/0228* (2013.01); *F25J 1/0234* (2013.01); *B01D 2257/504* (2013.01); *F01K 23/18* (2013.01); *F02C 6/18* (2013.01);
(Continued)

(58) Field of Classification Search
CPC .... F02C 3/305; F02C 6/14; F02C 6/16; F01K 25/06; F01K 23/04; F01K 9/003; Y02E 20/326; Y02P 10/122; Y02P 10/13; B01D 2257/504

USPC ................................................. 62/50.2, 50.5
See application file for complete search history.

(56) References Cited

U.S. PATENT DOCUMENTS 3,693,347 A    9/1972 Kydd et al.
5,412,938 A    5/1995 Keller
(Continued)

FOREIGN PATENT DOCUMENTS

DE    102009022491 A1 *    1/2011    ........... F01K 7/38
EP    2503111 A1    9/2012
(Continued)

OTHER PUBLICATIONS

Vankeirbilck et al., Organic Rankine Cycle as Efficient Alternative to Steam Cycle for Small Scale Power Generation, Jul. 2011, 8th International COnference on Heat Transfer, Fluid Mechanics, and Thermodynamics in POint AUx Piments, Mauritius, HEFAT2011, p. 785-792.*

(Continued)

*Primary Examiner* — Arun Goyal
*Assistant Examiner* — Stephanie Cheng
(74) *Attorney, Agent, or Firm* — Innovation Counsel LLP

(57) ABSTRACT

Apparatus, systems, and methods store energy by liquefying a gas such as air, for example, and then recover the energy by regasifying the liquid and combusting or otherwise reacting the gas with a fuel to drive a heat engine. The process of liquefying the gas may be powered with electric power from the grid, for example, and the heat engine may be used to generate electricity. Hence, in effect these apparatus, systems, and methods may provide for storing electric power from the grid and then subsequently delivering it back to the grid.

13 Claims, 6 Drawing Sheets

(51) Int. Cl.

| | |
|---|---|
| *F01K 23/10* | (2006.01) |
| *F25J 1/00* | (2006.01) |
| *B01D 7/00* | (2006.01) |
| *B25J 1/02* | (2006.01) |
| *F02C 6/14* | (2006.01) |
| *F02C 7/18* | (2006.01) |
| *F02C 6/18* | (2006.01) |
| *F25J 1/02* | (2006.01) |
| *F02C 7/08* | (2006.01) |
| *F01K 23/18* | (2006.01) |

(52) U.S. Cl.
CPC .............. *F02C 7/08* (2013.01); *F02C 7/18* (2013.01); *F05D 2220/32* (2013.01); *F05D 2220/60* (2013.01); *F05D 2220/72* (2013.01); *F05D 2220/76* (2013.01); *F05D 2260/42* (2013.01); *Y02C 10/12* (2013.01); *Y02E 20/16* (2013.01); *Y02E 60/15* (2013.01)

(56) References Cited

U.S. PATENT DOCUMENTS

| | | | | |
|---|---|---|---|---|
| 6,920,759 | B2* | 7/2005 | Wakana | F02C 6/14 60/726 |
| 7,406,829 | B2* | 8/2008 | Coffinberry | F02C 1/00 372/35 |
| 7,478,524 | B2 | 1/2009 | Kreitmeier | |
| 7,821,158 | B2† | 10/2010 | Vandor | |
| 7,870,746 | B2† | 1/2011 | Vandor | |
| 8,020,404 | B2† | 9/2011 | Vandor | |
| 8,063,511 | B2* | 11/2011 | Vandor | F01D 15/005 307/64 |
| 8,329,345 | B2 | 12/2012 | Koda et al. | |
| 8,907,524 | B2† | 12/2014 | Vandor | |
| 2001/0015060 | A1* | 8/2001 | Bronicki | F01K 23/10 60/39.6 |
| 2001/0039797 | A1* | 11/2001 | Cheng | F01K 21/042 60/39.182 |
| 2008/0011161 | A1 | 1/2008 | Finkenrath et al. | |
| 2008/0302133 | A1* | 12/2008 | Saysset | B01D 53/002 62/617 |
| 2011/0072819 | A1 | 3/2011 | Silva et al. | |
| 2011/0126549 | A1* | 6/2011 | Pronske | F01K 21/047 60/783 |
| 2011/0232545 | A1 | 9/2011 | Clements | |
| 2011/0252827 | A1* | 10/2011 | Lockwood | B01D 53/002 62/602 |
| 2012/0023947 | A1* | 2/2012 | Kulkarni | B01D 53/002 60/693 |
| 2013/0312386 | A1* | 11/2013 | Wirsum | B01D 53/1425 60/39.182 |
| 2013/0318969 | A1* | 12/2013 | Zhou | F01K 23/068 60/651 |
| 2015/0184593 | A1* | 7/2015 | Kraft | F02C 6/18 60/782 |
| 2015/0218968 | A1 | 8/2015 | Sinatov et al. | |
| 2015/0236527 | A1 | 8/2015 | Goldman | |
| 2015/0240654 | A1 | 8/2015 | Goldman | |
| 2015/0263523 | A1 | 9/2015 | Goldman | |
| 2018/0080379 | A1 | 3/2018 | Conlon | |
| 2018/0094550 | A1 | 4/2018 | Conlon | |
| 2018/0100695 | A1 | 4/2018 | Conlon | |

FOREIGN PATENT DOCUMENTS

| | | | | |
|---|---|---|---|---|
| EP | 2610470 | A2 * | 7/2013 | ............ F02G 5/00 |
| EP | 2634383 | A1 | 9/2013 | |
| JP | 04127850 | A | 4/1992 | |
| WO | 2007/096656 | A1 † | 8/2007 | |
| WO | 2013/116185 | A1 | 8/2013 | |

OTHER PUBLICATIONS

Z.S. Spakovsky, Unified: Thermodynamics and Propulsion Notes: (I) First Law of Thermodynamics (3) First Law Applied to Engineering Cycles (3.7) Brayton Cycle (3.7.1) Brayton Cycle Efficiency, Oct. 2011, MIT, Version 6.2.*

B.E. Enga and W.T. Thompson, Catalytic Combustion Applied to Gas Turbine Technology: High Temperature use for Metal Supported Platinum Catalysts, 1979, Platinum Metals Review, 23, (4), p. 134-141.*

Sara Eriksson, "Development of catalysts for natural gas-fired gas turbine combustors", 2006, KTH—Royal Institute of Technology, Stockholm, Sweden, Doctoral Thesis, ISBN 978-91-7178-543-5.*

Chacartegui et al., "Alternative ORC bottoming cycles FOR combined cycle power plants", Sep. 20, 2008, Elsevier, Applied Energy 86 (2009) 2162-2170, retrieved from sciencedirect.com on Oct. 17, 2018, https://www.sciencedirect.com/science/article/pii/S0306261909000737.*

Gail Reitenbach, Ph.D., "The Carbon Capture and Storage R&D Frontier", http://www.powermag.com, May 1, 2015, 12 pages.

International Search Report corresponding to PCT/US2014/071561, dated Apr. 20, 2015, 2 pages.

Yongliang Li, et al., "An integrated system for thermal power generation, electrical energy storage and CO2 capture", Int. J. Energy Res. 2011; 35:1158-1167.

Brian Stover, et al., "Liquid Air Energy Storage (LAES) Development Status and Benchmarking with other Storage Technologies", Power-Gen Europe 2014, Jun. 3-5, 2014, Cologne, 15 pages.

Centre for Low Carbon Futures 2050, "Liquid Air in the energy and transport systems Opportunities for industry and innovation in the UK, Summary Report and Recommendations", May 9, 2013, ISBN: 978-0-9575872-1-2, 32 pages.

Brian Stover, et al., "Process Engineering and Thermodynamic Evaluation of Concepts for Liquid Air Energy Storage", Power-Gen Europe 2013, Jun. 4-6, 2013, Vienna, 16 pages.

Supplementary European Search Report, EP1487752, dated Jun. 23, 2017, 1 page.

Sylvain Quoilin et al., "Techno-economic survey of Organic Rankine Cycle (ORC) Systems", Renewable and Sustainable Energy Reviews 22 (2013) pp. 168-186.

Jinwoo Park et al., A Novel Design of Liquefied Natural Gas (LNG) Regasification Power Plant Integrated with Cryogenic Energy Storage System, Ind. Eng. Chem. Res. 2017, 56, pp. 1288-1296.

* cited by examiner
† cited by third party

US 10,473,029 B2

LIQUID AIR POWER AND STORAGE

CROSS REFERENCE TO RELATED APPLICATIONS

This application claims benefit of priority to U.S. Provisional Patent Application No. 61/921,837 titled "Liquid Air Energy Storage With Hybrid Regasification" and filed Dec. 30, 2013, which is incorporated herein by reference in its entirety.

FIELD OF THE INVENTION

The invention relates generally to storing energy by liquefying air or another gas or gaseous mixture, and subsequently recovering stored energy upon regasifying the liquid. More particularly the invention relates to regasifying the liquid, mixing the resulting gas with a fuel, and combusting or otherwise chemically reacting the gas-fuel mixture to drive a heat engine such as a turbine, for example.

BACKGROUND

The electric power system comprises generation, transmission, and distribution assets, which deliver power to loads. With the introduction of renewable resources, the electric power system faces a number of constraints which favor the addition of storage assets.

The principal constraint on an interconnected grid is the need to maintain the frequency and voltage by balancing variations in generation and demand load. Failure to maintain the voltage or frequency within specifications causes protective relays to trip in order to protect generators, transmission and distribution assets from damage. Because of the interconnected dynamic electrical grid, underfrequency or undervoltage trips can cause a cascade of other trips, potentially leading to widespread blackouts.

Traditionally, electric utilities or the independent system operators managing electrical grids maintain a power generation reserve margin that can respond to changes in load or the loss of a generating unit or transmission line serving the load. These reserves are managed and scheduled using various planning methods, including day-ahead forecasts, dispatch queues that may be ordered based on generation cost, and generation ramp-rates, transmission constraints, outages, etc. The spinning generation units, that is, those that are operating, then respond to generation load control signals.

Many renewable resources are intermittent in nature, including wind farms, central station solar thermal or solar photovoltaic (PV) plants, and distributed photovoltaic systems including those on rooftops. These can produce power only when the resource is available, during daylight for solar, and when the wind is blowing for wind, leading to seasonal and diurnal production variations, as well as short-term fluctuations due to calms, gusts, and clouds. Gusts that exceed wind turbine ratings may cause them to trip with a sudden loss of full generation capacity. Deployment of these renewable systems as both central and distributed generating resources results in fluctuations in both the generation of power to be transmitted and the demand for power, since the distributed PV offsets load.

Base load is usually provided by large central station nuclear, hydroelectric or thermal power plants, including coal-fired steam plants (Rankine cycle) or gas-fired Combined Cycle Combustion Turbine plants (open Brayton air cycle with closed Rankine steam bottoming cycle). Base-load units often have operating constraints on their ramp rates (Megawatts per minute) and Turn-Down (minimum Megawatts), and startup from cold steel to rated load requires several hours to several days depending on the type and size of generating asset. Accordingly, a different class of load following power plants is also deployed in the electric power system, to complement the base load units. Generally, these load following units are less efficient in converting thermal energy to electrical energy.

This conversion efficiency is often expressed as a Heat Rate with units of thermal energy needed to produce a kilowatt-hour (kw-hr) of electricity [British Thermal Unit (BTU) per kw-hr in the U.S., kiloJoules (kJ) per kw-hr elsewhere]. The thermal equivalent of work is 3413 BTU/kw-hr or 3600 kJ/kw-hr, which represents 100% efficiency. Modern combined cycle power plants at full load rated conditions may have heat rates as low, for example, as 6000 kJ/kw-hr. Modern gas turbine peaking plants (e.g., General Electric LM6000-PC SPRINT) can achieve a full load rated condition heat rate of 9667 kJ/kw-hr (HHV). It is important to note that gas turbine heat rates increase rapidly away from rating conditions, and at part load in hot conditions the actual heat rate may be twice the rated Heat Rate.

It is of course desired to deliver electricity to customers at the lowest possible cost. This cost includes the amortization and profit on invested capital, the operating and maintenance (O&M) expense, and the cost of fuel. The capital amortization (and return on capital, in the case of regulated generators) is applied to the capacity factor (fraction of rated generation) to arrive at the price ($ per Megawatt-hour) associated with the fixed capital expense. The Heat Rate multiplied by the fuel cost determines the contribution of the variable fuel consumption to the electricity price. The O&M expenses generally have some combination of fixed and variable expenses, but are insignificant compared to capital and fuel for central station plants. Generating units have different mixes of fixed and variable expenses, but presumably were believed to be economic at the time they were ordered.

In order to deliver low cost electricity to a customer, it is necessary to operate the capital intensive units at high capacity, subject to fuel cost, in order to spread the capital cost across many kw-hr. Contrariwise, it is necessary to minimize the operation of units with high marginal operating cost (due to high Heat Rate, Fuel Cost or O&M). This was indeed the planning assumption for procurement of the existing fleet of generators.

The Renewable resources gather 'free' fuel, so their cost of generation is dominated by the amortization of the capital needed to gather and convert this energy into electricity. In order to profitably build and operate a Renewable power plant, it should have as high a capacity factor as may be practically realized. Similarly, the fuel-efficient base load generation should operate at high capacity factor, both to amortize the capital expense, and because its operating characteristics induce higher fuel or O&M costs (per unit of generation) when operated intermittently or at part load.

The increasing penetration of renewable generation with variable generation characteristics is challenging the traditional dispatch order and cost structure of the electric generation system. In practice, utility scale solar power plants without storage are limited to Capacity Factors of about 25%, and wind farms seldom exceed 50%. This capacity may not coincide with demand, and may be suddenly unavailable if the sun or wind resource is reduced by local weather. For example, if wind resources are available at periods of low demand, base load units must either ramp down or shut-down or the wind resource must be curtailed. If the wind is not curtailed, then less efficient peaking units may be needed to provide ramp flexibility that the large base-load units cannot provide in case of gusts or calms. Likewise the widespread deployment of solar power generation is depressing the need for generation during daylight hours, but large ramp rates as the sun rises and sets can currently only be met by gas fired peaking plants. Ironically, this will result in displacement of low-cost, high efficiency base-load units in favor of high cost, low-efficiency peaking units, with a concomitant increase in greenhouse gas releases.

For environmental, energy security, cost certainty and other reasons, renewable energy sources are preferred over conventional sources. Demand Response techniques, which attempt to reduce the instantaneous load demand to achieve balance between generation and consumption, are analogous to a peaking generation unit. Another approach is deployment of (e.g., large scale) energy storage systems which would mediate the mismatch between generation and consumption.

Storage systems are alternately charged to store energy (e.g., using electric power), and discharged to return the energy as power to the electric grid. The technical characteristics of energy storage systems include:
- the Capacity, or quantity of energy that can be stored and returned, measured in MW-hours;
- the Round Trip Efficiency (RTE), or fraction of the energy delivered to the storage system that is returned to the grid;
- the Power rating, or rate in MW at which the system can be charged or discharged (Power is often symmetric, though this is not necessary, or even desirable);
- the Lifetime, which is typically the number of Charge/Discharge cycles.

Pumped Storage Hydroelectricity (PSH) employs a reversible pump-turbine with two water reservoirs at different elevations. When excess energy is available, it is used to pump water from a lower to an upper reservoir, converting the electricity into potential energy. When electricity is needed, the water flows back to the lower reservoir through a hydro-turbine-generator to convert the potential energy into electricity. Pumped hydro storage is suitable for grid scale storage and has been used for many decades in electrical grids around the world. PSH has a Round Trip Efficiency (RTE) of 70% to 80% and can be deployed at Gigawatt scale with many days of potential storage. In addition to high RTE, PSH does not generate greenhouse gases during operation. Deployment of PSH requires availability of suitable locations for the construction of dams and reservoirs, and evaporative water loss may be an issue in some locations.

Compressed Air Energy Storage (CAES) stores pressurized air that is subsequently expanded in an engine. Commercially deployed CAES stores the air in large underground caverns such as naturally occurring or solution-mined salt domes, where the weight of overburden is sufficient to contain the high pressures. The RTE for CAES may be relatively low. The 110 MW McIntosh CAES plant in the US state of Alabama reportedly has a RTE of only 27%, for example. Several near-isothermal CAES technologies are also under development with reported RTE of 50% or greater, using pressure vessels for storage.

Many energy storage technologies are being developed and deployed for end-use loads or distribution level capacities, at power levels from a few kilowatts to several megawatts. These approaches typically employ batteries with a variety of chemistries and physical arrangements.

There is a need for high efficiency energy storage that is not dependent on geological formations, and which can be deployed at scales of tens to hundreds of megawatts to complement the existing generation and transmission assets.

SUMMARY

Apparatus, systems, and methods described in this specification store energy by liquefying a gas such as air, for example, and then recover the energy by regasifying the liquid and combusting or otherwise reacting the gas with a fuel to drive a heat engine. The process of liquefying the gas may be powered with electric power from the grid, for example, and the heat engine may be used to generate electricity. Hence, in effect these apparatus, systems, and methods may provide for storing electric power from the grid and then subsequently delivering it back to the grid.

In one aspect of the invention, a method of storing and recovering energy comprises regasifying liquid air or liquid air components to produce gaseous air or gaseous air components using heat from an exhaust stream from a first turbine, combusting at least a portion of the gaseous air or gaseous air components with a gaseous fuel to form a gaseous primary working fluid at an elevated temperature, expanding the primary working fluid through the first turbine, and producing electricity with a generator driven by the first turbine. The method may also comprise producing the liquid air or liquid air components in an electrically powered liquefaction process and storing the liquid air or liquid air components for later regasification and use in combusting the gaseous fuel. As elaborated on below, the heat from the first turbine exhaust gas stream used in regasifying the liquid air or liquid air components may be transferred from the first turbine exhaust gas stream to the liquid air or liquid air components via a secondary working fluid, but this is not required.

The gaseous fuel and gaseous air or gaseous air components may be combusted using a flame, or catalytically combusted. The gaseous fuel may be or comprise natural gas, for example. Different ones of the gaseous air components may be separately provided to a combustor in which they are combusted with the fuel, for example to support oxy-combustion followed by nitrogen dilution. The gaseous primary working fluid may be provided to an inlet of the first turbine at, for example, a temperature greater than or equal to about 1600 K and a pressure greater than or equal to about 30 bar. These pressure and temperature conditions are illustrative only, and are similar to the conditions at the inlet of an LM-6000 SPRINT PC, which is a commercially available combustion turbine often deployed for peaking duty. Higher temperatures increase the efficiency of a combustion turbine, but are constrained by metallurgical and economic considerations. The pressure is related to the volumetric flow rate through the turbine, which is choked, and is proportional to power output. Combustion turbine generators, comprising compression, combustion, and expansion sections, are most efficient at the peak temperature and pressure.

The method may comprise cooling the first turbine with a portion of the gaseous air or gaseous air components provided to the first turbine separately from the primary working fluid.

The method may comprise heating a secondary working fluid with heat from the exhaust gas stream from the first turbine to convert the secondary working fluid from a liquid phase to a gas phase, and then using the heated working fluid in a Rankine power cycle to generate additional electricity. The secondary working fluid may be an organic working fluid, for example, and the method may comprise regasifying the liquid air or liquid air components using heat transferred from the organic secondary working fluid to the liquid air or liquid air components, thereby condensing the organic secondary working fluid from a gas phase to a liquid phase. Alternatively, the secondary working fluid may be or comprise water.

The method may comprise heating water to produce superheated steam using heat from the exhaust gas stream from the first turbine, and mixing some or all of the superheated steam with the gaseous air and gaseous fuel during combustion of the gaseous air and gaseous fuel. The water may be first condensed out of the exhaust gas stream from the first turbine prior to being heated to produce superheated steam.

The method may comprise freezing carbon dioxide out of the exhaust gas stream from the first turbine by transferring heat from the exhaust gas stream to the liquid air or liquid air components to cool the first turbine exhaust gas stream. After the carbon dioxide is frozen out of the first turbine exhaust gas stream, a storage medium may be cooled by transferring heat from the storage medium to the cold first turbine exhaust gas stream. The cold storage medium may subsequently be used as a heat sink during liquefaction of additional liquid air or liquid air components.

The method may comprise heating water to produce superheated steam in a heat recovery steam generator with heat from the exhaust gas stream from the first turbine, mixing some or all of the superheated steam with the gaseous air or gaseous air components and gaseous fuel during combustion of the gaseous air or gaseous air components and gaseous fuel, heating an organic secondary working fluid in an organic vapor generator with heat from the first turbine exhaust gas stream to convert the organic secondary working fluid from liquid phase to gas phase (the organic vapor generator being located in the turbine exhaust stream downstream from the heat recovery generator), expanding the organic secondary fluid through a second turbine to drive another generator and thereby produce additional electricity, and condensing the organic secondary working fluid exhaust from the second turbine from gas phase to liquid phase by transferring heat from the organic secondary working fluid to the liquid air or liquid air components during regasification of the liquid air or liquid air components. In such cases the method may also comprise condensing the water out of the turbine exhaust stream in and/or downstream from the organic vapor generator, freezing carbon dioxide out of the first turbine exhaust gas stream by transferring heat from the first turbine exhaust gas stream to at least a portion of the liquid air or liquid air components in a carbon dioxide freezer located in the first turbine exhaust gas stream downstream from the organic vapor generator, preheating the organic secondary working fluid with heat from the second turbine exhaust gas stream prior to heating the organic secondary working fluid in the organic vapor generator, and/or bypassing the second turbine to condense the organic secondary working fluid from gaseous to liquid phase by transferring heat from the organic secondary working fluid to the liquid air or liquid air components without having expanded the organic secondary working fluid through the second turbine.

The method may comprise heating water to produce superheated steam in a heat recovery steam generator with heat from the exhaust gas stream from the first turbine, mixing some or all of the superheated steam with the gaseous air or gaseous air components and gaseous fuel during combustion of the gaseous air or gaseous air components and gaseous fuel, and condensing the water out of the first turbine exhaust gas stream during regasification of the liquid air or liquid air components by transferring heat from the first turbine exhaust gas stream to the liquid air or liquid air components in a regasifier located in the first turbine exhaust gas stream downstream from the heat recovery steam generator.

The method may comprise heating an organic secondary working fluid in an organic vapor generator with heat from the exhaust gas stream from the first turbine to convert the organic secondary working fluid from liquid phase to gas phase, freezing carbon dioxide out of the first turbine exhaust gas stream by transferring heat from the first turbine exhaust gas stream to at least a portion of the liquid air or liquid air components in a carbon dioxide freezer located in the first turbine exhaust gas stream downstream from the organic vapor generator, expanding the gaseous organic secondary working fluid through a second turbine to drive another generator and thereby produce additional electricity, and condensing the organic secondary working fluid exhaust from the second turbine generator from gas phase to liquid phase by transferring heat from the organic secondary working fluid to the liquid air or liquid air components during regasification of the liquid air or liquid air components. In such cases the method may also comprise cooling a storage medium by transferring heat from the storage medium to the first turbine exhaust gas stream after freezing the carbon dioxide out of the first turbine exhaust gas stream, and using the cooled storage medium as a heat sink during liquefaction of additional liquid air or liquid air components.

These and other embodiments, features and advantages of the present invention will become more apparent to those skilled in the art when taken with reference to the following more detailed description of the invention in conjunction with the accompanying drawings that are first briefly described.

DETAILED DESCRIPTION

Figure 1:
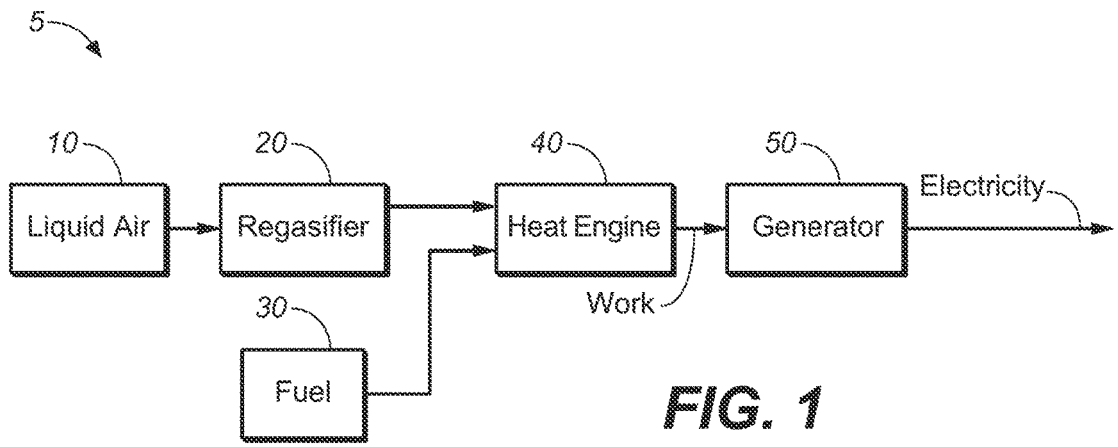
FIG. 1 shows a block diagram of an example liquid air power and storage system utilizing hybrid regasification to recover the stored energy for electricity production.

The following detailed description should be read with reference to the drawings, in which identical reference numbers refer to like elements throughout the different figures. For convenience in referring to the drawings, Table 6 at the end of this specification identifies the components and systems shown in the figures by reference numeral. The drawings, which are not necessarily to scale, depict selective embodiments and are not intended to limit the scope of the invention. The detailed description illustrates by way of example, not by way of limitation, the principles of the invention. This description will clearly enable one skilled in the art to make and use the invention, and describes several embodiments, adaptations, variations, alternatives and uses of the invention, including what is presently believed to be the best mode of carrying out the invention. As used in this specification and the appended claims, the singular forms "a," "an," and "the" include plural referents unless the context clearly indicates otherwise.

This specification discloses apparatus, systems, and methods by which energy may be stored by liquefying a gas such as air, for example, and then recovered by regasifying the liquid and combusting the gas with a fuel to drive a heat engine. The combination of regasifying the liquid and combusting it with a fuel is referred to herein as "hybrid regasification". The process of liquefying the gas may be powered with electric power from the grid, for example, and the heat engine may be used to generate electricity. Hence, in effect these apparatus, systems, and methods may provide for storing electric power from the grid and then subsequently delivering it back to the grid. The electricity for liquefying the gas may be provided, for example, from base load power generation or from renewable resources that would otherwise be curtailed, and hence may be effectively low cost. Consuming the fuel in this manner may increase the efficiency with which the fuel is converted to electricity, compared to conventional power generation.

Referring now to example liquid air energy storage system 5 illustrated by the block diagram of FIG. 1, liquid air (or another liquefied gas) from liquid air source 10 is converted to a gaseous state in regasifier 20 and provided to heat engine 40. Fuel from fuel source 30 is also provided to heat engine 40, where it is combusted or otherwise chemically reacted with the gas from regasifier 20 to generate heat. Heat engine 40 converts the heat to work that is used to drive electric generator 50 to generate electricity.

Liquid air source 10 may comprise, for example, apparatus for liquefying air or another gas, and storage tanks for storing the resulting liquid. Alternatively, or in addition, liquid air or another liquefied gas may be produced off-site and delivered by tanker truck, tanker rail car, or any other suitable transport to storage tanks in liquid air source 10. Hence liquid air source 10 need not include liquefaction apparatus. Although in examples described below this specification refers to the liquefied gas used in the energy storage systems it describes as liquid "air" (i.e., the mixture of nitrogen, oxygen, and other gases occurring naturally in the atmosphere near the surface of the earth) or liquefied air components, any suitable gas or mixture of gases that may be chemically reacted with a fuel to produce heat may be used in addition or instead of liquid air. The liquefied gas may be stored at approximately atmospheric pressure, for example.

Fuel source 30 may comprise any suitable combination of fuel storage, fuel conditioning, and fuel transport apparatus. The fuel used in the energy storage systems described herein may be or comprise, for example, any suitable gaseous, liquid, or solid material that may be chemically reacted with gas from regasifier 20 to generate heat. Suitable fuels include but are not limited to, for example, natural gas, hydrogen, petroleum, petroleum products, petroleum coke, coal, pulverized coal, wood, or other naturally occurring or man-made carbonaceous materials. The fuel may be a fossil fuel, for example. Solid or liquid materials may, for example, be gasified or converted to another gaseous fuel (for example, syngas) prior to delivery to heat engine 40. Alternatively, or in addition, solid or liquid fuels may be delivered as solids or liquids to heat engine 40.

Heat engine 40 may combust or catalytically combust the gas-fuel mixture, or use any other suitable chemical reaction of the gas-fuel mixture to produce heat. Heat engine 40 may be or comprise a combustion turbine, a steam turbine, an organic working fluid gas turbine, a reciprocating engine, or any other suitable heat engine. Heat engine 40 may operate on any suitable thermodynamic cycle. As further described below, liquid air energy storage systems as described herein may optionally include more than one heat engine, in which case the heat engines may be arranged with the exhaust of one heat engine used as the heat source for another heat engine in a combined cycle configuration.

Generator 50 may be or comprise any suitable electric generator.

Figure 2:
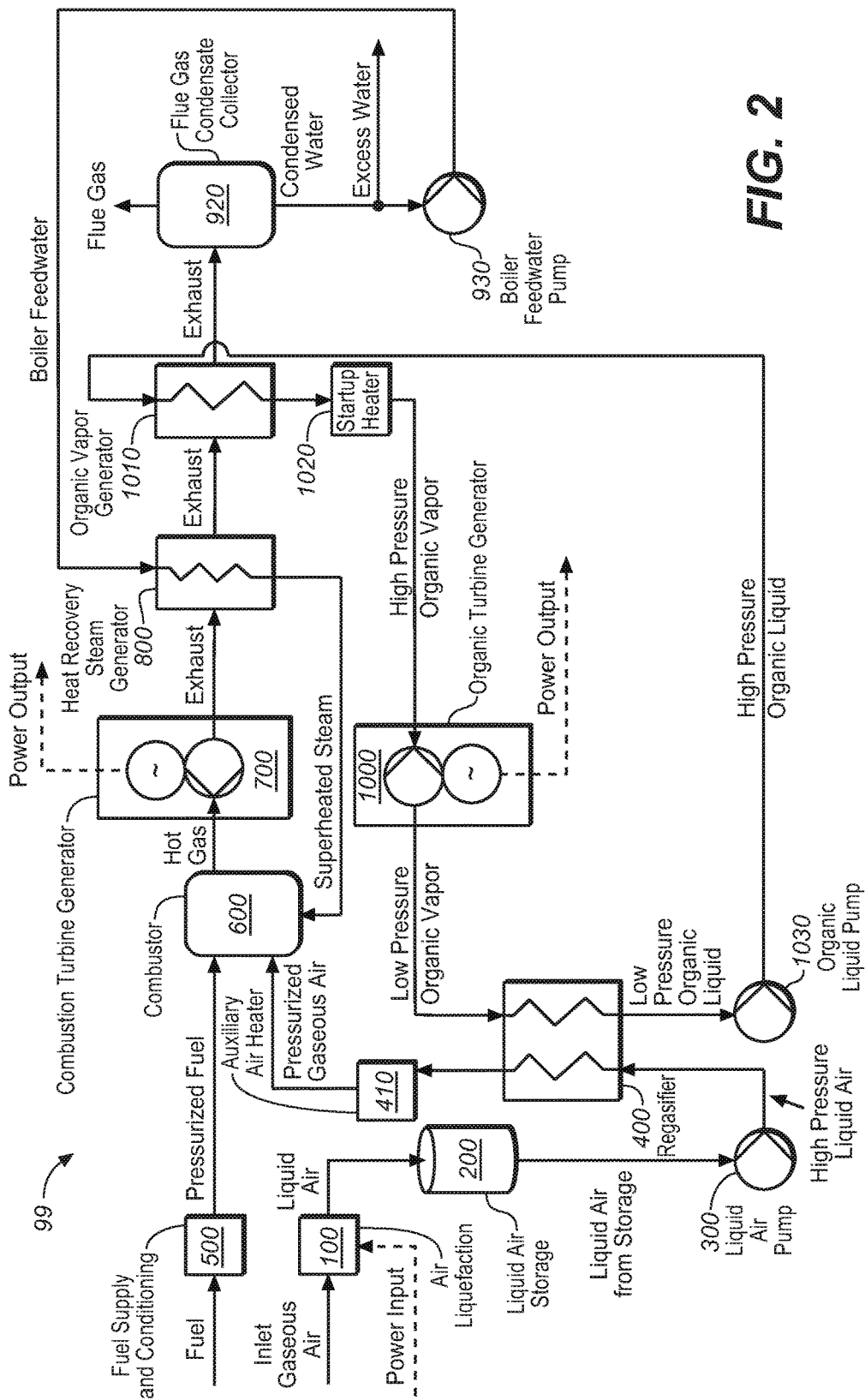
FIGS. 2-4 and FIG. 6 show block diagrams of additional example liquid air power and storage systems utilizing hybrid regasification to recover the stored energy for electricity production.

FIG. 2 shows a block diagram of an example liquid air energy storage system 99 that includes subsystems corresponding individually or in combination to the subsystems of energy storage system 5 of FIG. 1, as well as additional subsystems. Liquid air energy storage system 99 is described below as combusting a gaseous fuel (e.g., natural gas) in the presence of regasified liquid air or regasified liquid air components to drive a combustion turbine generator. As the preceding portion of the specification indicates, however, the invention is not limited to this particular combination of liquefied gas, fuel, and heat engine. Rather, any suitable combination of liquefied gas, fuel, and heat engine may be used in variations of liquid air energy storage system 99.

Referring now to FIG. 2, during charging of liquid air energy storage system 99 gaseous air is liquefied in air liquefaction subsystem 100, which consumes electricity to liquefy air using any suitable commercially available air liquefier. Air liquefiers and related technologies suitable for use in this subsystem may include those available, for example, from Air Liquide S.A., Praxair Technology, Inc., and Linde AG. Heat evolved during the liquefaction process as a result of the phase change from gas to liquid may optionally be stored in an optional thermal energy storage subsystem (not shown) as sensible heat or as latent heat in suitable phase change materials, for subsequent use in regasifying the liquid air in liquid air regasification subsystem 400 described in more detail below. Alternatively or in addition, some, most, or all of the heat removed during the liquefaction process may be rejected to the environment.

Air liquefaction subsystem 100 may be designed to separate the air into its various components. Some of the components, such as Argon, may be separated out and sold for use by third parties. As another example, carbon dioxide may be separated out for sale and/or use in enhanced oil recovery, or otherwise sequestered as part of a greenhouse gas reduction program. Fractionation of air may also be used for example for the principal components, nitrogen and oxygen, to permit oxy-combustion (in the heat engine) to reduce nitrogen oxide formation, facilitate sequestration of carbon dioxide, and/or to permit commercial sale of these air components if they are not needed in their naturally occurring amounts or ratio.

The liquefied air or liquefied air components produced by air liquefaction subsystem 100 may be transferred to and stored in liquid air storage subsystem 200, which typically comprises one or more conventional insulated storage tanks maintained near atmospheric pressure. The cryogenic liquid may be stored as a mixture or as separate components in different tanks. The quantity of liquefied air in the tanks increases as the energy storage system is charged, and decreases as the energy storage system is discharged. Although there are small evaporative losses as a result of heat transfer from the environment, the cryogenic liquid can be stored for extended periods, facilitating energy storage during weekends, at night, or during other periods when, for example, relatively less expensive electricity is available in anticipation of generation during periods of higher value. The liquefied air may be stored at a temperature of about 78 K, for example.

During discharge of liquid air energy storage system 99, one or more liquid air pumps 300 are controlled to pump liquid air from liquid air storage subsystem 200 in response to the demand for energy. If the liquid air is stored as a mixture of components to be transferred together, a single pump 300 (as shown) may be sufficient. If instead different liquid air components are to be separately transferred, to facilitate oxy-combustion for example, two or more pumps 300 may be arranged in parallel to do so. The pump or pumps may operate at variable speeds to provide a metering function and/or to maintain a desired or necessary pressure at an inlet to combustion turbine generator subsystem 700. Alternatively, the pump or pumps may operate at constant speeds, and control valves (not shown) may be used to meter the liquid air and/or to maintain the pressure at the inlet to the turbine generator.

Pump or pumps 300 may pump the liquefied air, which is typically at about atmospheric pressure during storage, to a higher inlet pressure required by the heat engine. For example, pump 300 may pump the liquefied air to a pressure of about 35 bar.

Liquid air pumped by pump 300 from liquid air storage subsystem 200 passes through liquid air regasification subsystem 400, which evaporates the cryogenic liquid by heat transfer from, for example, working fluids, combustion heaters, and/or thermal energy storage to provide high pressure gaseous air. (Regasification subsystem 400 is also referred to in this specification as "regasifier 400"). In the illustrated example, during normal operation most of the heat for this process is supplied by heat exchange from the sensible and latent heat of the working fluid used in an organic working fluid Rankine bottoming cycle described in more detail below. As an alternative (not shown in FIG. 2), heat for liquid air regasification subsystem 400 may be discharged from heat recovery steam generator subsystem 800, which is also described in more detail below. High pressure liquid air may enter regasification system 400 at a pressure of about 35 bar and temperature of about 80 K, for example. High pressure gaseous air may leave regasification system 400 at a pressure of about 35 bar and a temperature of about 380 K, for example.

Auxiliary air heater 410, which may be or include one or more combustion heaters for example, and/or may include heat exchangers using heat available from other processes, may provide auxiliary heat to the liquid or gaseous air at system start-up or during other transients, such as load changes, for which heat transfer to regasification subsystem 400 from the bottoming cycle or from the heat recovery steam generator 800 may be insufficient. Auxiliary air heater 410 may also be used at other times as well, to stabilize and/or control the temperature of the gaseous air provided to the heat engine and to increase its temperature. High pressure gaseous air may leave auxiliary air heater 410 at a pressure of about 35 bar and a temperature of about 400 K to about 500 K, for example. Or auxiliary air heater 410 may be bypassed or not operated so that high pressure gaseous air is provided to the heat engine at approximately the same conditions as produced in the regasifier 400.

After passing through auxiliary heater 410, the high pressure gaseous air enters combustion subsystem 600, where it is mixed and combusted with fuel from fuel supply and conditioning subsystem 500. (Combustion subsystem 600 is also referred to in this specification as "combustor 600").

Fuel supply and conditioning subsystem 500 conditions and meters the fuel in order to regulate the temperature at the inlet to the combustion turbine generator subsystem 700, which is described in more detail below. In the illustrated example the fuel is a gas, such as natural gas or hydrogen, for example. Alternatively, the fuel may be a liquid, for example a distillate fuel such as an oil or alcohol, or a solid such as coal or wood, for example. As suitable, customary compressors, pumps, or conveyors are used to condition and meter the fuel. In the illustrated example, the gaseous fuel may be supplied to fuel system 500 from tanks or by pipeline at, for example, atmospheric pressure and ambient temperature. Fuel system 500 compresses the gas to raise its pressure and temperature to, for example, about 31 bar and about 667 K, and supplies it to combustion system 600. In other embodiments the gaseous fuel may be supplied at higher pressures, and require little or no pressure increase.

Combustion subsystem 600 mixes and combusts the air and fuel supplied from regasification subsystem 400 and fuel system 500 to create a high temperature and high pressure primary working fluid for expansion through combustion turbine generator subsystem 700. In the illustrated example, combustion subsystem 600 also mixes in superheated steam, but this is not required. The primary working fluid comprises uncombusted regasified air components (principally nitrogen and oxygen), the products of combustion (principally water vapor and carbon dioxide), and may also include superheated steam. It is often desired to reduce the production of nitrogen oxides, which are a regulated pollutant and precursor to photochemical smog. In some variations, the air, fuel and superheated steam may be pre-mixed in various combinations to reduce the unwanted production of nitrogen oxides. In other variations, the fuel may be burned in a pure oxygen environment, followed by steam injection to reduce the temperature, followed by dilution with nitrogen. This also may reduce the unwanted production of nitrogen oxides. Sufficient reduction of nitrogen oxides may permit less expensive pollution control measures, such as operation without expensive selective catalytic reduction. In some variations, a catalytic combustor may be used instead of a flame. The heat of combustion increases the temperature of the mixture of air, steam and combustion products to, for example, about 1600 K, which is a typical inlet temperature for modern combustion turbines.

The hot gaseous primary working fluid created in combustion subsystem 600 is provided to the inlet of combustion turbine generator subsystem 700, which extracts energy from the working fluid as it expands through the turbine. The turbine may be similar in design and construction to modern combustion turbine power sections. The primary fluid may have, for example, a temperature of about 1600 K and a pressure of about 31 bar at the inlet to the turbine. Optionally, a stream of regasified air from regasification subsystem 400 may bypass combustion subsystem 600 and be provided to turbine generator subsystem 700 to cool the turbine components, including blades and vanes. This may allow operation at temperatures up to about 1750 K or higher, for example. Alternatively or additionally, the turbine blades may be optionally cooled with steam. Other temperature and pressure combinations may be used and will result in different flow rates throughout the overall system. Generally, the pressure and temperature may be selected to optimize the economic return, subject to constraints of materials and code classifications.

In the illustrated system, high turbine inlet pressure is available without the high compression work required in a conventional Brayton cycle combustion turbine generator (which includes a compressor section) because both the liquid air and the liquid water (vaporized in the heat recovery steam generation subsystem 800) are approximately incompressible fluids. Because performance is less sensitive to pressure drop, this also permits more flexible arrangement of the combustion subsystem inlet ducting and power take-off.

The turbine section of the turbine generator may, for example, be coupled to a synchronous generator, either directly or through a gearbox. In the synchronous connection, rotational speed and volumetric flow is constant, and because flow is choked, the inlet pressure is proportional to the power output. Accordingly the outlet pressure of the liquid air, liquid water and gaseous fuel supply may be regulated in proportion to the output power.

FIG. 2 shows combustion subsystem 600 and combustion turbine generator subsystem 700 separately. In some variations these subsystems may be physically separate, which may facilitate use of solid fuels. Alternatively, these subsystems may be physically integrated, in which case they may be viewed as components of a single subsystem.

The primary working fluid pressure and temperature is reduced after energy is extracted by combustion turbine subsystem 700, for example to about 800 K and about 1.5 bar. The turbine generator discharge pressure is the "back pressure" necessary for the exhaust mixture to flow through heat recovery steam generator subsystem 800, organic vapor generator 1010, and flue gas condensate collector 920 and its flue. It may be desirable to minimize the back pressure in order to extract more work from the primary working fluid. Condensing water vapor from the exhaust mixture induces a vacuum effect which tends to reduce the back pressure, thereby increasing the extracted work.

In the illustrated example, after exiting the combustion turbine the primary working fluid flows across a heat exchanger in heat recovery steam generator subsystem 800. Boiler feedwater is pumped through this heat exchanger to produce the superheated steam which is mixed with the fuel and air in combustion subsystem 600. The superheated steam may have a pressure of about 35 bar and a temperature of about 780 K, for example. The primary working fluid, which has now been cooled, for example, to about 578 K at about 1.25 bar, then flows across a heat exchanger in organic vapor generator 1010 to heat a second (organic) working fluid. On exiting this second heat exchanger the primary working fluid flows into flue gas condensate collector 920. At this stage the primary working fluid is cooled sufficiently to condense water vapor, which is separated and extracted, with the balance of the gas exhausted up a flue or chimney.

In an alternative variation, the flue gas may be further cooled to approximately 190 K, for example, using the liquid air stream in order to freeze carbon dioxide. A scraped surface heat exchanger would allow crystalline carbon dioxide to be collected for capture and storage. The carbon dioxide could then be sequestered, thereby permitting the system to be carbon dioxide neutral, despite burning fossil fuel. Alternatively, the solid-phase carbon dioxide could be stored and then used to pre-cool air in the liquefaction system, with the sublimated carbon dioxide being released to the atmosphere, captured as a carbonate, or compressed for sequestration as a vapor.

A selective catalytic reduction (SCR) system may be located at any suitable place in the exhaust stream from combustion turbine generator subsystem 700 in order to reduce the concentration of nitrogen oxides to permissible levels.

Water condensed from the primary working fluid in flue gas condensate collector 920 may be separated and collected in a tank. The condensate arises from superheated steam that was mixed with the fuel and air in combustion subsystem 600 and from water of combustion (a reaction product resulting from hydrogen in the fuel). This condensate may require treatment before being returned to heat recovery steam generator subsystem 800, for example to adjust the pH because of carbonic or nitrous/nitric acids that may dissolve in the condensate from carbon dioxide or nitrogen oxide combustion products.

The larger fraction of condensate is recycled to the heat recovery steam generator subsystem 800 by boiler feedwater pump 930, which increases the pressure of the boiler feedwater sufficiently for the resulting superheated steam to be mixed in combustion subsystem 600. The flow rate of feedwater may be controlled, for example, to maintain a specified superheated steam temperature, in order to maximize the economic return during the energy discharge mode of operation. This economic return may be a balance between fuel cost and electricity value, such that increased feedwater flow necessitates increased fuel flow (at constant combustion system outlet temperature) resulting in increased power output, versus constant fuel flow with higher feedwater flow and lower temperature.

Heat recovery steam generator subsystem 800 may have a once through configuration, which is capable of rapid startup and shutdown, high turn-down ratio and dry operation (without feedwater flow or steam generation) to provide the operating flexibility desired in an energy storage system that may be dispatched quickly and at varying loads. Alternative variations may instead employ drum type boilers with either natural or forced circulation. Boiler feedwater pump 930 may be controlled by a variable speed drive to deliver liquid water to the heat recovery steam generator, or a control valve may be used. In a once through configuration, feedwater is metered to control the temperature of superheated steam leaving the boiler, it typically being desirable to maximize the temperature in order to minimize fuel consumption. In a drum boiler configuration the feedwater is metered to maintain water inventory, i.e. the drum level, and a steam control valve is used to meter the steam flow rate in order to manage the steam drum pressure.

Liquid air energy storage system 99 includes an optional Rankine bottoming cycle that extracts heat from the primary working fluid to a suitable secondary working fluid such as, for example, an organic, water, ammonia, or refrigerant to generate additional electric power, while transferring heat to regasification subsystem 400. The secondary working fluid may be a binary mixture and/or an azeotrope, for example. In the illustrated example, regasification subsystem 400 condenses a low pressure gaseous organic secondary working fluid to produce a low pressure organic working fluid. Organic liquid pump 1030 then pumps the liquid to a higher pressure and through organic vapor generator 1010, which vaporizes the liquid to provide a high pressure gas that expands through a turbine in organic turbine generator 1000 to generate additional electric power. The low pressure organic vapor exhaust from organic turbine generator 1000 is then recycled through regasification subsystem 400. Suitable organic Rankine cycle turbine generators may include those available from Ormat Technologies, Inc. Suitable organic working fluids may include, for example, alkanes (e.g., propane) and hydrofluorocarbons (e.g., R134a), or other compounds such as ammonia or carbon dioxide.

A startup heater 1020, which may be or include one or more combustion heaters for example, and/or may include heat exchangers using heat available from other processes, may provide auxiliary heat to the liquid or gaseous organic fluid at system start-up or during other transients, such as load changes, for which heat transfer to regasification subsystem 400 from the bottoming cycle or from the heat recovery steam generator may be insufficient. Startup heater 1020 may also be used at other times as well, to stabilize and/or control the temperature of the secondary working fluid to the organic turbine generator 1010 and to increase its temperature. Startup heater 1020 may share a heat source with auxiliary air heater 410 described above. Optionally, the liquid air power and storage system may include only one or the other of startup heater 1020 and auxiliary heater 410, but not both, as their functions may be duplicative or partially duplicative.

If propane is used as the secondary working fluid, it may be heated for example to approximately 575 K at about 100 bar, expanded through the turbine generator to generate electric power, and then condensed at about 1.5 bar in the regasification subsystem to transfer heat to the evaporating cryogenic air. High pressure gaseous propane may leave startup heater 1020 at a pressure of about 100 bar and a temperature of about 500 K to about 600 K, for example.

The use of an organic Rankine bottoming cycle employing regasification subsystem 400 as a heat sink may be particularly advantageous, because the organic working fluid may be selected to condense but not freeze during heat exchange with liquid air in regasification subsystem 400. In contrast, a Rankine bottoming cycle employing water as a working fluid and regasification system 400 as a heat sink might risk freezing the working fluid.

Variations of liquid air energy storage system 99 may employ a steam Rankine bottoming cycle in addition to or instead of the illustrated organic Rankine cycle, however. For example, a steam Rankine cycle may be inserted between heat recovery steam generator subsystem 800 and the organic Rankine cycle subsystem, with heat exchange between the steam and organic Rankine bottoming cycles providing a heat sink for the steam Rankine cycle and a heat source for the organic Rankine cycle.

Tables 1-5 below identify unit operations and provides process conditions for an example implementation of liquid air storage energy system 99 modeled using conventional commercially available power engineering software tools as if it were a continuous process. In the modeled implementation, for which the fuel is natural gas, an air flow of about 100 kilograms per second would generate approximately 120 MW of electric power while consuming about 168 MW of fuel (on a Higher Heating Value basis). If air was liquefied only during the discharge phase, approximately 88 MW of electric power would be consumed, resulting in an overall RTE of about 47%. Assuming six hours of discharge, there would be four hours of charging for each hour of discharge, so the liquefaction system would consume approximately 22 MW. The modeled process assumes perfect combustion without unburned hydrocarbons or production of nitrogen oxides or carbon monoxide. Also, in the modeled implementation the liquid air is not separated into its components.

Typical operation of such an energy storage system might demand, for example, 4 hours of discharge, requiring 14,400 seconds times 100 kg/s or 1440 metric tonnes of liquid air. This is at the small range of tonnage of commercially available air separation plants, for example. At a specific volume of 0.001147 cubic meters per kilogram, 1650 cubic meters of storage tanks would be required. This could be satisfied by two ten meter high by ten meter diameter atmospheric storage tanks. The tanks may typically be filled during periods of low electricity prices, for example on weekends and overnight. For redundancy and to take advantage of periods of low capacity or low electric prices, extra tanks may be installed.

The process conditions listed in Tables 1-5 are intended to be illustrative but not limiting. Other temperatures, pressures, flow rates, and working fluids may be utilized in order to optimize the cost, auxiliary power consumption, safety and handling, or convenience.

Figure 3:
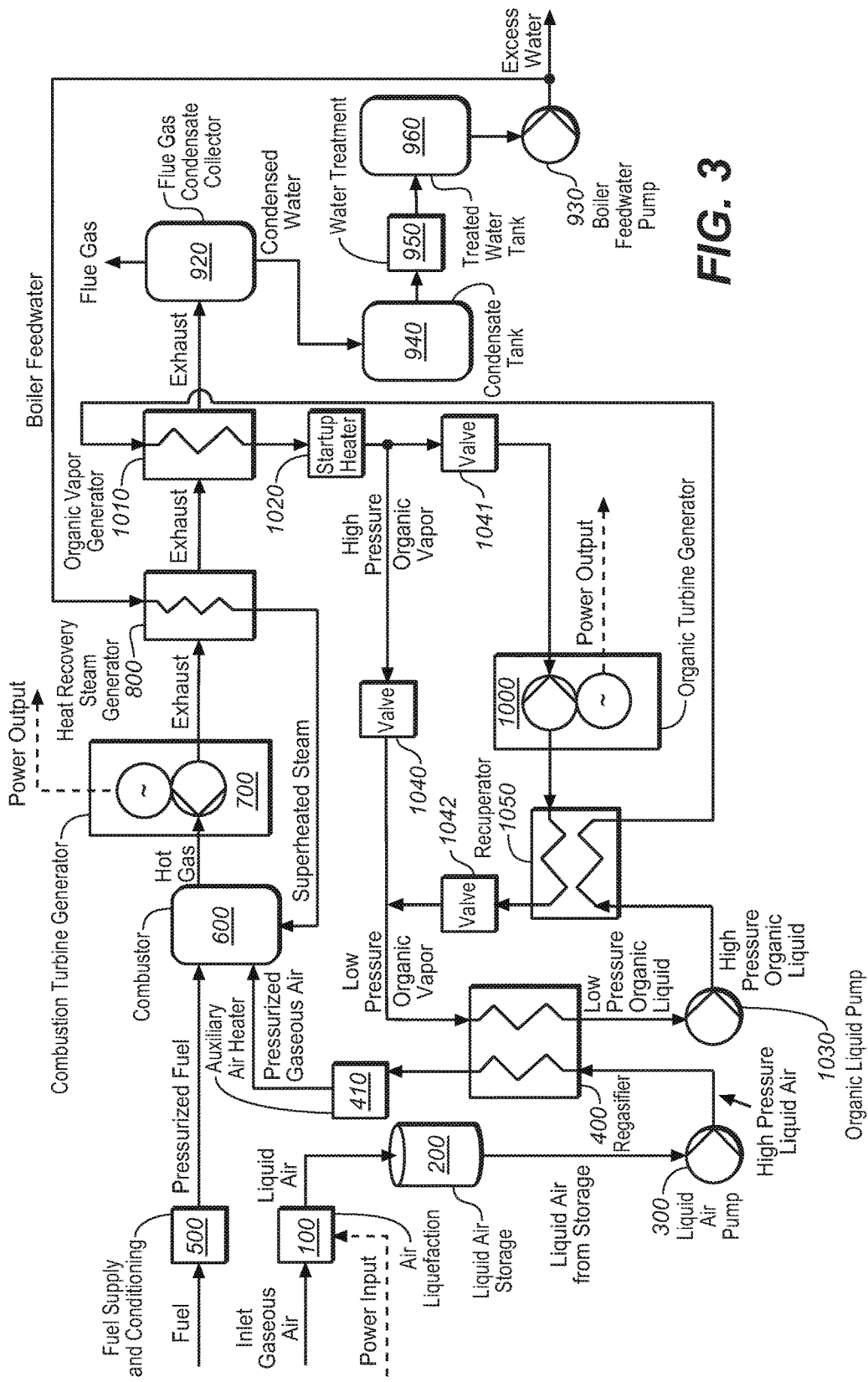

FIG. 3 shows an example liquid air power and storage system that includes additional optional components, compared to the system of FIG. 2, that provide alternative bottoming cycle arrangements. In the example system of FIG. 3 valves 1040, 1041, and 1042 may be configured to optionally route the bottoming cycle working fluid to bypass organic turbine generator 1000 and instead flow directly to regasification system 400. This bypass configuration may be useful, for example, during startup of the bottoming cycle or when the bottoming cycle turbine generator is out of service.

The example system of FIG. 3 also includes an optional recuperator 1050 positioned in the exhaust stream of organic vapor generator 1000 upstream from regasification system 400. Recuperator 1050 preheats the high pressure organic liquid exiting organic liquid pump 1030 with heat transferred from the low pressure organic vapor exhaust from organic turbine generator 1000, before the organic liquid enters organic vapor generator 1010.

In alternative variations organic turbine generator 1000 and recuperator 1050 are absent, and an organic working fluid circulates to transfer heat from the combustion turbine exhaust to regasification system 400 in a flow path similar or equivalent to the organic turbine generator bypass configuration of the system shown in FIG. 3.

Referring again to FIG. 3, the illustrated system also comprises optional condensate tank 940, water treatment system 950, and treated water tank 960. Water may flow from condensate collector 920 to condensate tank 940. Water treatment system 950 may process the condensate to remove oxides of carbon, nitrogen, sulfur, or other combustion products, and to adjust pH for storage in treated water tank 960. Boiler feedwater pump 930 draws water from treated water tank 960. Tanks 940 and 960 may each be sized to accommodate the total water condensed during discharge of the energy storage system. Water Treatment System 950 may optionally be operated exclusively or principally during the charging phase, to reduce energy demand during the more valuable discharge phase and to permit selection of a smaller capacity and hence cheaper water treatment system which could process condensate during the longer duration charging phase.

Figure 4:
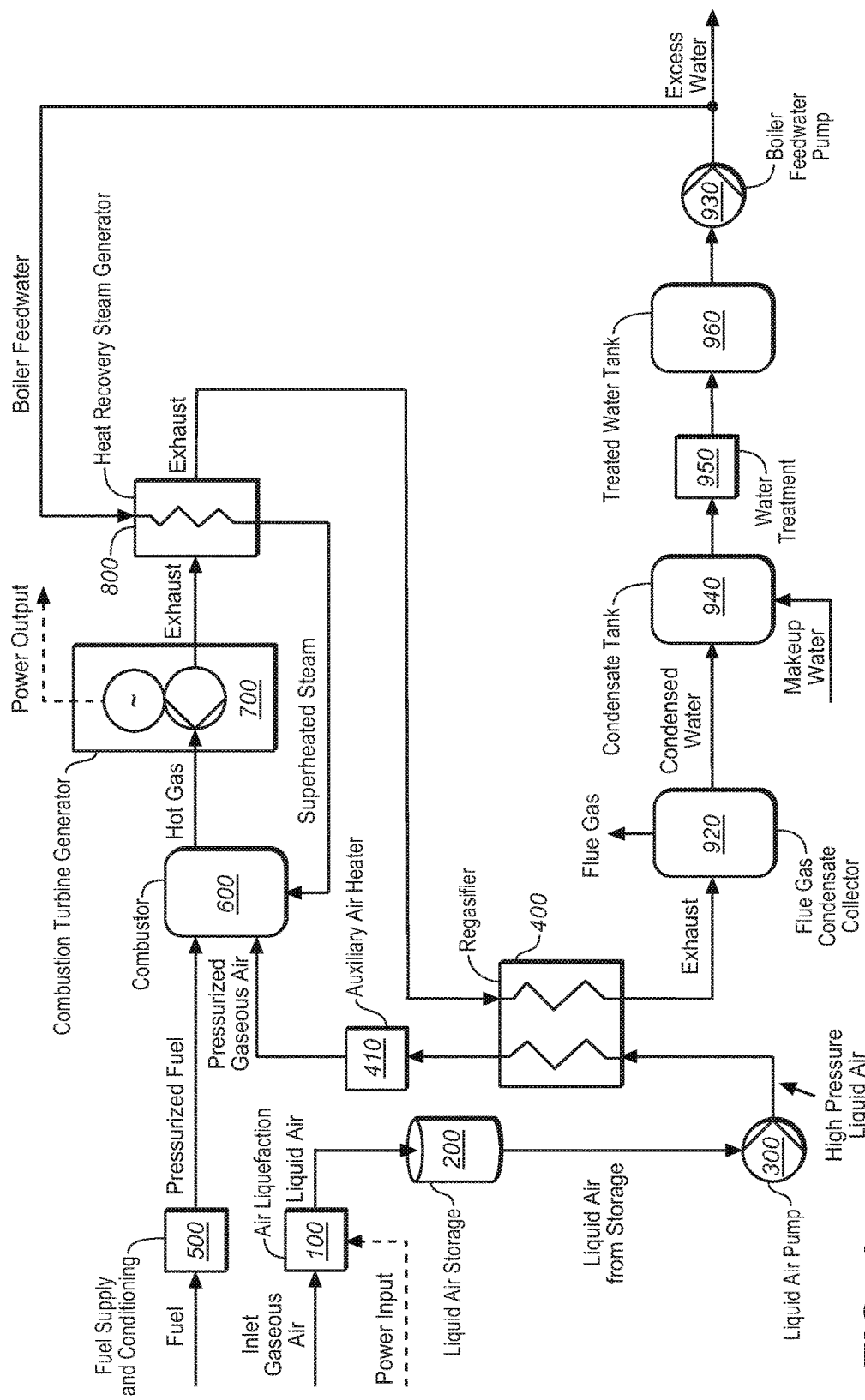

FIG. 4 shows an example liquid air power and storage system that lacks a bottoming cycle and uses the combustion turbine exhaust gas to directly heat and regasify the liquid air. In this example, superheated steam is injected into combustor 600 and mixed with pressurized fuel and gaseous air which burns to produce hot gas for expansion through turbine-generator 700. Exhaust gas from the turbine generator passes through heat recovery steam generator 800, which converts boiler feedwater from pump 930 into superheated steam. The exhaust gas then enters regasifier 400 where it evaporates and heats high pressure liquid air. Water vapor in the exhaust gas, which includes water of combustion and injected steam, is condensed by heat transfer in the regasifier, separated by condensate collector 920, and transferred to condensate tank 940 for subsequent treatment by water treatment system 950, after which it is transferred to treated water tank 960. Depending on the amount of injected steam and the amount and composition of the fuel there may be excess water recovered or there may be a need for makeup water.

By way of illustration, in one example about 15 kg/s of boiler feedwater enters heat recovery steam generator 800 at about 318 K, where it is evaporated at about 33 bar and superheated to about 853 K. The resulting superheated steam is mixed in combustor 600 with about 100 kg/s of re-gasified air, and burned completely with about 3.69 kg/s of methane. The hot combustion gas enters turbine-generator 700 at a temperature of about 1675 K and a pressure of about 31 bar, where it generates about 135.2 MW of electric power. The exhaust gas from turbine-generator 700 enters heat recovery steam generator 800 at a temperature of about 876 K and leaves at about 528 K, then enters regasifier 400 to evaporate the liquid air at about 35 bar and then heat the air to about 513 K. Flue gas leaves gasifer 400 at a temperature of about 327 K, and about 14.2 kg/s of condensate is collected by collector 920, so about 95% of the injected steam would be recovered. If air liquefaction consumes about 0.4 kWh per kilogram, then the Round Trip Efficiency (RTE, ratio of electric power produced to consumed) is about 94% and the Heat Rate (specific fuel consumption) is about 5460 kJ/kWh.

Increasing the steam injection flow rate increases the power produced by turbine-generator 700 and increases the Round Trip Efficiency, at the expense of increased Heat Rate and an increased requirement for makeup water. Assuming the same turbine inlet pressure (about 31 bar), temperature (about 1675 K) and steam injection temperature (about 853 K, which may be limited by metallurgical constraints), with about 20 kg/s of steam injection the fuel flow increases to about 4.1 kg/s and the power output increases to about 145.6 MW. With the same electric power requirement for air liquefaction, the Round Trip Efficiency becomes 100% at a Heat Rate of about 5656 kJ/kWh, while the water recovery ratio is reduced to about 78%.

Likewise, decreasing the steam injection flow rate, at the same turbine inlet and steam injection pressure and temperature, has an opposite effect. With about 10 kg/s of steam injection, the fuel flow rate is reduced to about 3.275 kg/s and the power output decreases to about 126.0 MW, resulting in a Round Trip Efficiency of about 87% and a Heat Rate of about 5220 kJ/kWh, while the water recovery ratio becomes about 128%, since almost all of the water of combustion is recovered as condensate.

Figure 5:
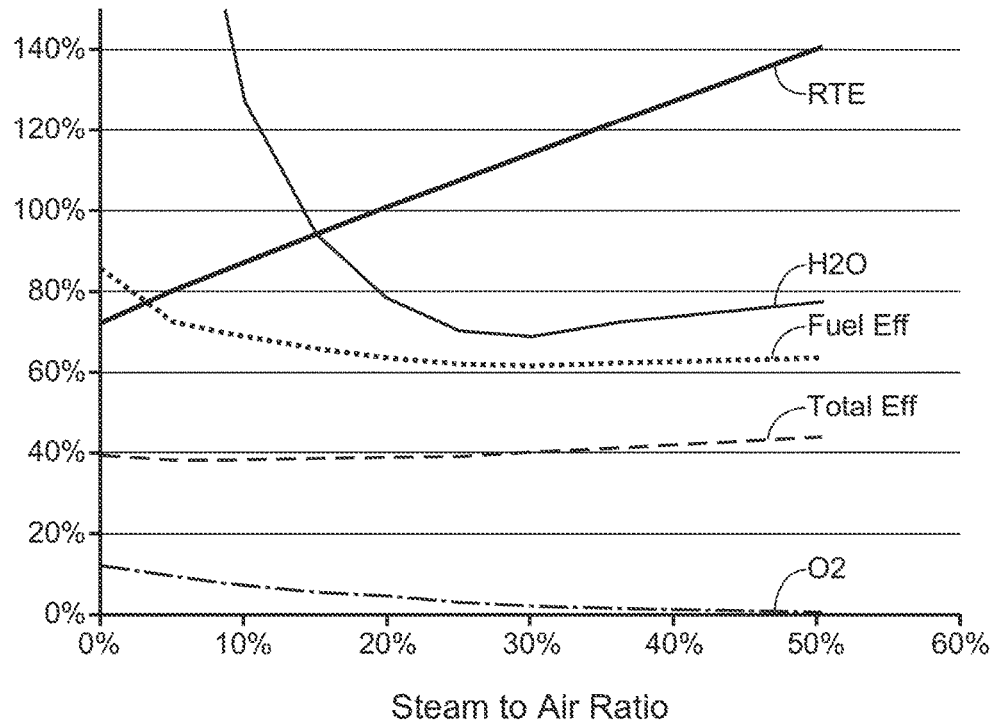
FIG. 5 shows a plot illustrating the effect of steam injection on the efficiency of electric power production by the example liquid air power and storage system of FIG. 4.

FIG. 5 illustrates the effect on efficiency as the steam injection ratio is increased. The Round Trip Efficiency as defined above increases in proportion to steam injection because the additional mass flow increases the output power. The water recovery ratio decreases with increasing steam injection to a minimum that occurs when there is sufficient flow of feedwater to cause condensation in the heat recovery steam generator. The Fuel Efficiency (power output divided by the fuel heat release rate) and Total Efficiency (power divided by the fuel and electric power input) also decrease to a minimum and then increase with increasing steam injection. The maximum steam to air ratio occurs when all of the oxygen has been consumed, at about 50% steam to air ratio under the temperature and pressure conditions described above.

The above results illustrate the trade-off between Round Trip Efficiency and power output on the one hand versus Heat Rate and water recovery ratio on the other hand. Liquid air power and storage systems and plants as described herein may be designed accordingly, considering the costs of fuel and water, and the relative value of consumed electricity used for liquefying air compared to generated electricity. Once designed, a liquid air and storage system may be operated with different steam injection flow rates, depending on the contemporaneous economic factors. Operation at conditions different from the design condition may be readily accommodated by varying the inlet pressure to the turbine, including by adjustment of the discharge pressure of liquid air pump 300 and boiler feedwater pump 930.

Condensing water vapor from the exhaust gas can consume a significant fraction of the heat sink provided by the liquid air in a liquid air power and storage system. As an alternative, steam injection into the combustor may be reduced or eliminated to reserve an increased portion of the heat sink provided by the liquid air for freezing and separating carbon dioxide out of the combustion turbine exhaust gas.

Figure 6:
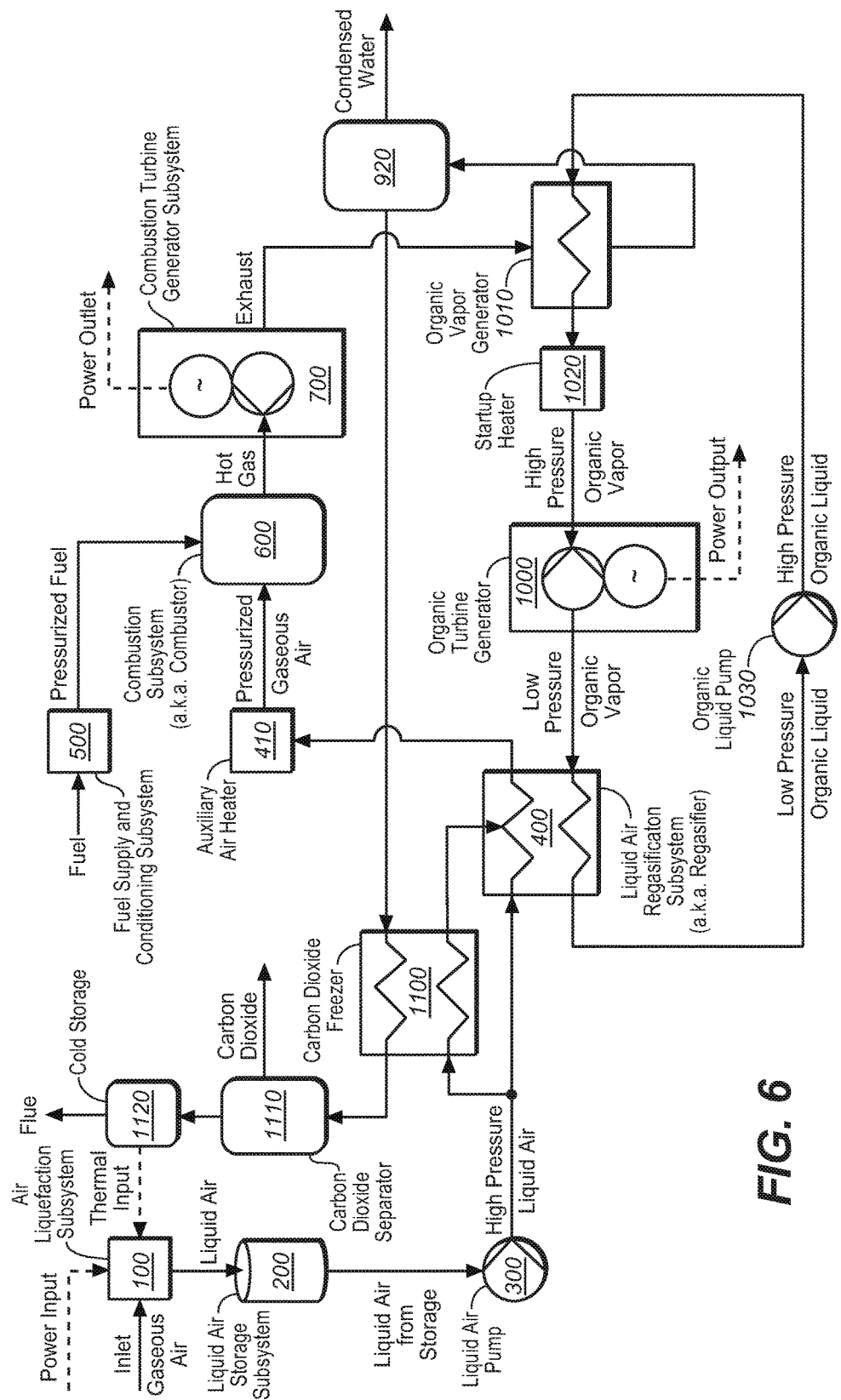

For example, in the liquid air power and storage system illustrated in FIG. 6 pressurized liquid air from pump 300 is split into two streams. One stream of pressurized liquid air is gasified in regasifier 400 by heat exchange with and condensation of the exhaust from organic Rankine Cycle turbine generator 1000. Condensed organic working fluid exiting regasifier 400 is pressurized by pump 1030, evaporated and superheated in organic vapor generator 1010 by hot exhaust gas exiting turbine-generator 700, and expanded again through turbine-generator 1000 in an organic Rankine bottoming cycle operating similarly to those described above.

Water of combustion in the exhaust gas from turbine generator 700 is condensed by heat transfer in organic vapor generator 1010 and removed by collector 920. The exhaust gas then flows into carbon dioxide freezer 1100, which is cooled by heat transfer to the second stream of pressurized liquid air, causing formation of dry ice (frozen carbon dioxide) which is removed from the exhaust gas by carbon dioxide separator 1110. The frozen carbon dioxide may be collected on a scraped-surface heat exchanger or collected as snow in an inertial separator, for example. Though shown separately, carbon dioxide freezer 1100 and carbon dioxide separator 1110 may be an integrated unit. The collected frozen carbon dioxide may, for example, be sequestered or used as a heat sink to reduce energy consumption of the air liquefaction unit. From carbon dioxide freezer 1100 and carbon dioxide separator 1110, the exhaust gas flows to optional cold storage unit 1120 where the cold exhaust gas cools a storage medium prior to being discharged up the flue. Cold storage unit 1120 may provide cooling to air liquefaction unit 100 during the charging phase of operation. The storage medium in cold storage unit 1120 may comprise, for example, chilled water, brine, a silicate ester (e.g., Coolanol®), a water-ice mixture, or any other suitable material.

The second stream of pressurized liquid air may be partially or completely regasified in carbon dioxide freezer 1100, from which it flows to regasifier 400 where it is mixed with the first stream of liquid air to assist in cooling the organic working fluid exhaust from turbine-generator 1000. The combined air stream then flows through optional auxiliary air heater 410 before being mixed and combusted with pressurized fuel in combustor 600. The resulting combustion gases, including the aforementioned water of combustion and carbon dioxide, expand through turbine-generator 700 to produce power.

By way of illustration, about 100 kg/s of liquid air at a pressure of about 32 bar and a temperature about 499 K mixes with about 3.06 kg/s of methane and burns in combustor 600 to produce a hot gas mixture at about 1675 K and about 31 bar. This mixture expands through turbine-generator 700 to produce about 108 MW of electric power, exhausting at about 848 K. The exhaust gas enters organic vapor generator 1010 where it is cooled by the organic working fluid to about 273 K, transferring about 83 MW of heat.

About 6.8 kg/s of the condensed water of combustion is removed from the exhaust gas by collector 920. The remaining 96.2 kg/s of exhaust gas flows to carbon dioxide freezer 1100, which transfers about 7.7 MW of heat to liquid air, and which cools the exhaust gas to about 193 K. About 8.4 kg/s of dry ice (solid carbon dioxide) is removed by carbon dioxide separator 1110, and the remaining 87.8 kg/s of exhaust gas flows through cold storage unit 1120, absorbing about 8.9 MW of heat to warm the flue gas to about 293 K.

About 20 percent of the liquid air is directed to carbon dioxide freezer 1100. About 53.5 MW of heat is absorbed in regasifier 400 to condense about 50 kg/s of propane at about 0.125 bar and then cool the propane to about 173 K. The liquid propane is pumped to about 105 bar and then flows to the organic vapor generator 1010 where it is evaporated and then superheated to a temperature of about 726 K. The superheated propane vapor flows through the organic Rankine cycle turbine-generator 1000 to generate about 31 MW of power. The low pressure propane at about 498 K then flows to regasifier 400 to be cooled by about 20 kg/s of cold air from the carbon dioxide freezer 1100 and the liquid air.

Under these conditions, a total of about 136.8 MW of electric power is generated by the two generators, with a fuel consumption of about 4648 kJ/kWh. The initial charge of liquid air may consume for example about 0.4 kWh of electricity per kg of liquid air, resulting in a Round Trip Efficiency (as defined to refer only to electrical power) of about 96% and an overall efficiency (including fuel consumption) of about 43.6%. Use of the optional cold storage unit during subsequent charging cycles would reduce the electric power consumption and increase the efficiency.

If high carbon fuels such as coal, petroleum coke, or biomass were burned instead of methane, more liquid air would be directed to the carbon dioxide freezer to effect the separation of carbon dioxide.

The availability and cost of electricity may vary hourly, daily and seasonally, as may the load demand and price of electricity. These parameters are influenced by market and regulatory forces, as well as by constraints on the operation of generation and transmission assets due to weather, emissions, planned or forced outages, and public policy. Accordingly, the quantity of air to be liquefied and stored may be varied throughout each day and seasonally.

Figure 7:
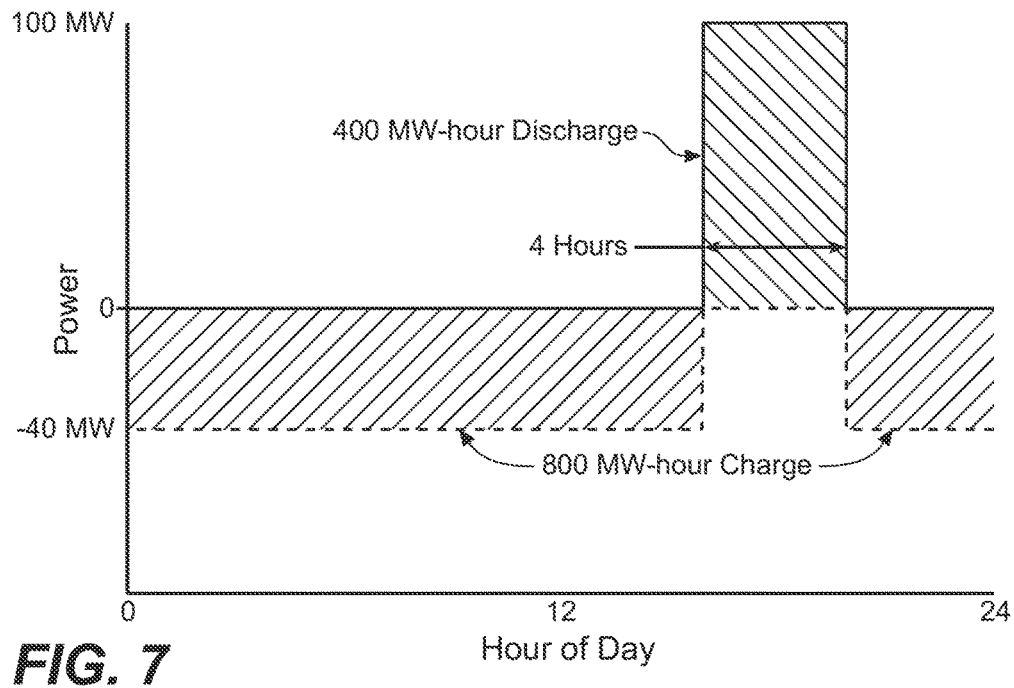
FIG. 7 shows a plot illustrating an example charge/discharge cycle for a liquid air power and storage system as disclosed herein, in which charging and discharging occur at different times.

FIG. 7 shows a plot that illustrates a diurnal charge/discharge cycle for an energy storage system with a 50% Round Trip Efficiency when the charging and discharging are not coincident. In the example illustrated, 40 MW of electric power charges the storage for 20 hours. The storage is discharged over 4 hours at a rate of 100 Megawatts. The RTE is the ratio of energy discharge to energy charge, or 400 MW-hour over 800 MW-hour. For non-coincident charging and discharging, $\Pi=\eta/\gamma$, where $\Pi$ is the ratio of discharge power $P_d$ to charge power $P_c$ in MW, $\eta$ is the ratio of discharge energy to charge energy in MW-hours, and $\gamma$ is the ratio of discharge time to charge time in hours.

Figure 8:
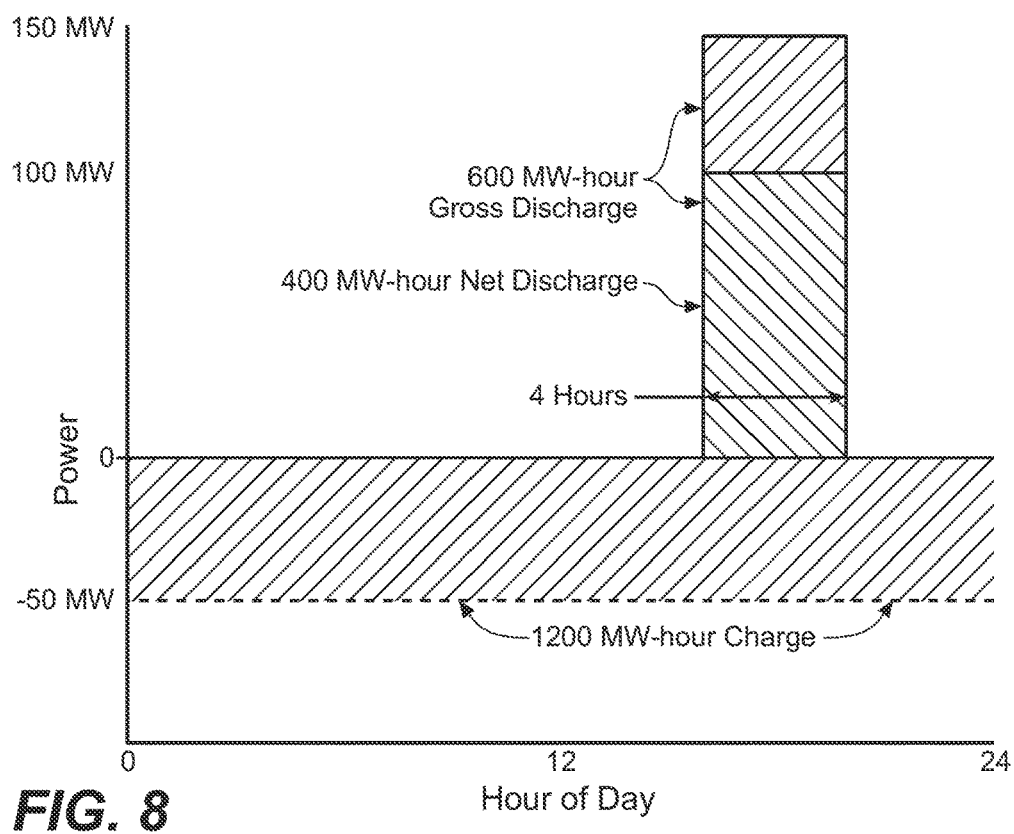
FIG. 8 shows a plot illustrating an example charge/discharge cycle for a liquid air power and storage system as disclosed herein, in which the charging system operates continuously.

It may be advantageous for the charging system to operate continuously, as illustrated by the plot shown in FIG. 8. In order to achieve the same net power $P_n$ during discharge as in the non-coincident example, the discharge power must increase compared to the non-coincident example. It can be shown that $P_n=P_d[1-\gamma/\eta]$ (where $P_d$, $\gamma$, and $\eta$ are defined above). In the example illustrated in FIG. 4, 50 MW of power is used to charge the system 24 hours per day. To deliver 100 MW of net power during the 4-hour long discharge period, the discharge rate is 150 MW. The overall energy consumption increases from 800 to 1200 MW-hours.

Liquid air energy storage systems as described herein may provide numerous technical, economic, and practical benefits and advantages over the prior art. These benefits may include the following.

- Hybridization with a fuel source leverages the work in the stored liquid air, permitting a smaller liquefaction plant and smaller tank farm for cryogenic storage.
- Flexible combustion system configurations permit a wide variety of fuels to be burned, and permit greatly reduced nitrogen oxide pollutants by means of staging the combustion with cooling superheated steam and diluent air.
- The use of a smaller turbine, adapted from existing aero derivative or industrial frame units, because all of the shaft work produces useful power. In contrast a conventional combustion turbine generator delivers only about one-third of the shaft power to electricity generation, with most shaft work used for air compression.
- The power output is not significantly influenced by atmospheric pressure or temperature, unlike conventional turbine generators which suffer significant performance degradation at high altitudes or high ambient temperatures.
- The Heat Rate of the unit (KJ of fuel per KW-HR of electricity) may be superior to other fossil thermal generation systems, and consume for example less than half the fuel of a gas turbine peaker plant.
- The use of a compact once through heat recovery steam generator with regenerative steam injection may permit faster startup, more flexible operation, and better part load efficiency than conventional combined cycle power plants.
- Water may be condensed from the flue gas for recycling in the Heat Recovery Steam Generator and excess water can be produced, potentially providing additional benefit.
- Carbon dioxide can be frozen from the flue gas, making the system carbon neutral, or better considering the carbon dioxide that may be removed during liquefaction.

The marginal generating cost of electricity with the liquid air energy storage systems described herein is the cost of fuel and electricity. Using the process conditions of Tables 1-5 and assuming four hours of storage, the system would generate about 463 Megawatt-hours and consume about 352 Megawatt-hours of electricity and about 672.8 Megawatt-hours of fuel (Higher Heating Value). A peaker plant, such as a GE LM6000 PC-SPRINT at full-load with a heat rate of about 9163 Btu/kw-hr (Higher Heating Value) would consume about 4242 Million Btu to produce 463 Megawatt-hours of electricity (Gross, before accounting for auxiliary load). For fuel at about $6.00 per Million Btu, the peaker plant fuel cost is about $25,455 compared to about $12,000 for the fuel consumed by the invention. For a marginal cost, the invention could spend $13,455 to purchase 352 Megawatt-hours of electricity, for liquefaction costs. This is about $38 per megawatt-hour. Consideration should also be given to the cost of carbon dioxide emissions. Burning natural gas, the LM6000 SPRINT PC produces 0.5 tonnes per Megawatt-hour, compared to 0.26 tones per Megawatt-hour for the conditions described in tables 1-5. At a CO2 value of $30 per tonne, this is equivalent to $7.20 per MWH, which would reduce the break-even electricity cost for charging the storage system to about $31 per Megawatt-Hour. Off-peak electricity is often less expensive than this.

This disclosure is illustrative and not limiting. Further modifications will be apparent to one skilled in the art in light of this disclosure and are intended to fall within the scope of the appended claims.

TABLE 1

Air flow to and from storage

| Stream | Inlet air | Liq Air from storage | HP Liq Air | Combustor Inlet Air | Burner Inlet Air | Unit |
|---|---|---|---|---|---|---|
| Pressure | 1 | 1 | 35 | 34.975 | 34.974 | bar |
| Temperature | 293 | 78.6574 | 80.5105 | 375.223 | 375.223 | K |
| Flow rate | 101.36 | 101.36 | 101.36 | 101.36 | 101.36 | kg/s |
| Flow Oxygen | 23.4564 | 23.4564 | 23.4564 | 23.4564 | 23.4564 | kg/s |
| Flow Nitrogen | 76.5471 | 76.5471 | 76.5471 | 76.5471 | 76.5471 | kg/s |
| Flow Water | 0 | 0 | 0 | 0 | 0 | kg/s |
| Flow Argon | 1.30567 | 1.30567 | 1.30567 | 1.30567 | 1.30567 | kg/s |
| Flow Carbon dioxide | 0.0483579 | 0.0483579 | 0.0483579 | 0.0483579 | 0.0483579 | kg/s |
| Flow Neon | 0.00128381 | 0.00128381 | 0.00128381 | 0.00128381 | 0.00128381 | kg/s |
| Flow Helium-4 | 7.3402e−05 | 7.3402e−05 | 7.3402e−05 | 7.3402e−05 | 7.3402e−05 | kg/s |
| Flow Krypton | 0.000334303 | 0.000334303 | 0.000334303 | 0.000334303 | 0.000334303 | kg/s |
| Flow Xenon | 0.000229717 | 0.000229717 | 0.000229717 | 0.000229717 | 0.000229717 | kg/s |
| Flow Nitrous oxide | 0.000452814 | 0.000452814 | 0.000452814 | 0.000452814 | 0.000452814 | kg/s |
| Flow Methane | 0.000112281 | 0.000112281 | 0.000112281 | 0.000112281 | 0.000112281 | kg/s |
| Vapor phase Mass fraction | 1 | 0.000835267 | | 1 | 1 | |
| Liquid phase Mass fraction | | 0.999165 | 1 | | | |

TABLE 2

Combustor streams (assumes no nitrogen oxide formation in combustor 600)

| Stream | Fuel, Air, Steam Mixture entering Combustor (600) | Hot Gas | CTG (700) Exhaust | HRSG (800) Exhaust | Organic Vapor Generator (1010) Exhaust | Flue Gas | Unit |
|---|---|---|---|---|---|---|---|
| Pressure | 31 | 31 | 1.5 | 1.25 | 1 | 1 | bar |
| Temperature | 458.865 | 1473.16 | 809.466 | 571.78 | 310.828 | 310.828 | K |
| Flow rate | 113.965 | 113.965 | 113.965 | 113.965 | 113.965 | 101.198 | kg/s |
| Flow Oxygen | 23.4564 | 11.3689 | 11.3689 | 11.3689 | 11.3689 | 11.3688 | kg/s |
| Flow Nitrogen | 76.5471 | 76.5471 | 76.5471 | 76.5471 | 76.5471 | 76.5471 | kg/s |
| Flow Water | 9.57533 | 16.3806 | 16.3806 | 16.3806 | 16.3806 | 3.61352 | kg/s |
| Flow Argon | 1.30567 | 1.30567 | 1.30567 | 1.30567 | 1.30567 | 1.30567 | kg/s |
| Flow Carbon dioxide | 0.0484588 | 8.36073 | 8.36073 | 8.36073 | 8.36073 | 8.36059 | kg/s |
| Flow Neon | 0.00128381 | 0.00128381 | 0.00128381 | 0.00128381 | 0.00128381 | 0.00128381 | kg/s |
| Flow Helium-4 | 7.34021e−05 | 7.34021e−05 | 7.34021e−05 | 7.34021e−05 | 7.34021e−05 | 7.3402e−05 | kg/s |
| Flow Krypton | 0.000334303 | 0.000334303 | 0.000334303 | 0.000334303 | 0.000334303 | 0.000334303 | kg/s |
| Flow Xenon | 0.000229717 | 0.000229717 | 0.000229717 | 0.000229717 | 0.000229717 | 0.000229717 | kg/s |
| Flow Nitrous oxide | 0.00045282 | 0.00045282 | 0.00045282 | 0.00045282 | 0.00045282 | 0.000452812 | kg/s |
| Flow Methane | 3.03011 | 0 | 0 | 0 | 0 | 0 | kg/s |
| Vapor phase Mass fraction | 1 | 1 | 1 | 1 | 0.887973 | 1 | |
| Liquid phase Mass fraction | | | | | 0.112027 | 0 | |

TABLE 3

Water streams

| Stream | Excess (Produced) Water | Condensed Water | Boiler Feedwater | Superheated Steam | Unit |
|---|---|---|---|---|---|
| Pressure | 1 | 1 | 33 | 31 | bar |
| Temperature | 310.828 | 310.828 | 311.114 | 809.467 | K |
| Flow rate | 3.1918 | 9.57541 | 9.57541 | 9.57544 | kg/s |
| Flow Oxygen | 1.96165e−06 | 5.88496e−06 | 5.88496e−06 | 5.88496e−06 | kg/s |
| Flow Nitrogen | 7.01679e−07 | 2.10504e−06 | 2.10504e−06 | 2.10503e−06 | kg/s |

TABLE 3-continued

Water streams

| | Stream | | | | |
|---|---|---|---|---|---|
| | Excess (Produced) Water | Condensed Water | Boiler Feedwater | Superheated Steam | Unit |
| Flow Water | 3.19177 | 9.5753 | 9.5753 | 9.57533 | kg/s |
| Flow Argon | 2.15592e−07 | 6.46776e−07 | 6.46776e−07 | 6.46775e−07 | kg/s |
| Flow Carbon dioxide | 3.36205e−05 | 0.000100862 | 0.000100862 | 0.000100862 | kg/s |
| Flow Neon | 1.01417e−10 | 3.04252e−10 | 3.04252e−10 | 3.04252e−10 | kg/s |
| Flow Helium-4 | 6.36421e−12 | 1.90926e−11 | 1.90926e−11 | 1.90926e−11 | kg/s |
| Flow Krypton | 1.04047e−10 | 3.12141e−10 | 3.12141e−10 | 3.12141e−10 | kg/s |
| Flow Xenon | 1.37266e−10 | 4.11798e−10 | 4.11798e−10 | 4.11797e−10 | kg/s |
| Flow Nitrous oxide | 1.91954e−09 | 5.75863e−09 | 5.75863e−09 | 5.75865e−09 | kg/s |
| Flow Methane | 0 | 0 | 0 | 0 | kg/s |
| Vapor phase Mass fraction | | | | 1 | |
| Liquid phase Mass fraction | 1 | 1 | 1 | | |

TABLE 4

Organic fluid flows (shown as propane)

| | Stream | | | | |
|---|---|---|---|---|---|
| | Low Pressure Organic Liquid | High Pressure Organic Liquid | High Pressure Organic Vapor | Low Pressure Organic Vapor | Unit |
| Pressure | 1.5 | 101.5 | 101.25 | 1.5 | bar |
| Temperature | 200 | 205.619 | 571.78 | 419.844 | K |
| Flow rate | 60 | 60 | 60 | 60 | kg/s |
| Vapor phase Mass fraction | | | 1 | 1 | |
| Liquid phase Mass fraction | 1 | 1 | | | |

TABLE 5

Principal power flows

| Operation | Value | Unit |
|---|---|---|
| Liquid Air Storage (200) | 88.1966 | MW |
| Combustor (600) | 168.2 | MW |
| Auxiliary Air Heater (410) | 0.0 | MW |
| Startup Heater (1020) | 0.0 | MW |
| Auxiliary Loads (pumps) | 4.4839 | MW |
| Combustion Turbine Generator (700) | 102.302 | MW |
| Organic Turbine-Generator (1010) | 18.0428 | MW |
| Round Trip Efficiency (HHV) | 46.94 | % |

TABLE 6

Identity of Components and Systems by Reference Numeral

| Reference Numeral | Component or System |
|---|---|
| 5 | liquid air energy storage system |
| 10 | liquid air source |
| 20 | regasifier |
| 30 | fuel source |
| 40 | heat engine |
| 50 | electric generator |
| 99 | liquid air energy storage system |
| 100 | air liquefaction subsystem |
| 200 | liquid air storage subsystem |
| 300 | liquid air pump |
| 400 | liquid air regasification subsystem (a.k.a regasifier) |
| 410 | auxiliary air heater |
| 500 | fuel supply and conditioning subsystem |
| 600 | combustion subsystem (a.k.a. combustor) |
| 700 | combustion turbine generator subsystem |
| 800 | heat recovery steam generator subsystem |
| 920 | flue gas condensate collector |
| 930 | boiler feedwater pump |
| 940 | condensate tank |
| 950 | water treatment system |
| 960 | treated water tank |
| 1000 | organic turbine generator |
| 1010 | organic vapor generator |
| 1020 | startup heater |
| 1030 | organic liquid pump |
| 1040 | valve |
| 1041 | valve |
| 1042 | valve |
| 1050 | recuperator |
| 1100 | carbon dioxide freezer |
| 1110 | carbon dioxide separator |
| 1120 | cold storage |

What is claimed is:

1. A method of storing and recovering energy, the method comprising:

regasifying liquid air or liquid air components to produce gaseous air or gaseous air components using heat from an exhaust gas stream from a first turbine;

heating water to produce superheated steam with heat from the exhaust gas stream;

mixing some or all of the superheated steam with a gaseous fuel and at least a portion of the gaseous air or gaseous air components to form a mixture and combusting the mixture to form a gaseous primary working fluid at an elevated temperature;

expanding the gaseous primary working fluid through the first turbine;

producing electricity with a generator driven by the first turbine;

heating a secondary working fluid in liquid phase with heat from the exhaust gas stream, and condensing at least a portion of steam out of the exhaust gas stream to transfer additional heat to the secondary working fluid, thereby converting the secondary working fluid from liquid phase to gas phase;

expanding the secondary working fluid in gas phase through a second turbine to drive another generator and thereby produce additional electricity;

condensing the secondary working fluid exhausted from the second turbine from gas phase to liquid phase by transferring heat from the secondary working fluid to the liquid air or liquid air components during regasification of the liquid air or liquid air components, wherein the regasifying the liquid air or liquid air components to produce the gaseous air or gaseous air components using heat from the exhaust gas stream from the first turbine comprises freezing carbon dioxide out of the exhaust gas stream by transferring heat from the exhaust gas stream to the liquid air or liquid air components to cool the exhaust gas stream;

cooling a storage medium by transferring heat from the storage medium to the exhaust gas stream after freezing the carbon dioxide out of the exhaust gas stream; and using the cooled storage medium as a heat sink during liquefaction of the liquid air or liquid air components.

2. The method of claim 1, comprising producing the liquid air or liquid air components in an electrically powered liquefaction process and storing the liquid air or liquid air components for later regasification and use in combusting the gaseous fuel.

3. The method of claim 1, wherein combusting the mixture of gaseous air or gaseous air components and fuel comprises combusting the mixture of gaseous air or gaseous air components and fuel catalytically.

4. The method of claim 1, wherein the gaseous fuel is or comprises natural gas.

5. The method of claim 1, comprising separately providing different ones of the gaseous air components to a combustor in which they are combusted with the fuel.

6. The method of claim 1, comprising providing the gaseous primary working fluid to an inlet of the first turbine at a temperature greater than or equal to 1600 K and a pressure greater than or equal to 30 bar.

7. The method of claim 1, wherein the secondary working fluid is an organic working fluid.

8. The method of claim 1, wherein the secondary working fluid is or comprises water.

9. The method of claim 1, wherein the heating water to produce superheated steam with heat from the exhaust gas stream comprises heating at least the portion of the steam condensed out of the exhaust gas stream to produce the superheated steam with heat from the exhaust gas stream.

10. The method of claim 1, comprising preheating the secondary working fluid in liquid phase with heat from the secondary working fluid exhausted from the second turbine prior to heating the secondary working fluid in liquid phase with heat from the exhaust gas stream.

11. The method of claim 1, comprising bypassing the second turbine to condense the secondary working fluid from gaseous to liquid phase by transferring heat from the secondary working fluid to the liquid air or liquid air components without having expanded the secondary working fluid through the second turbine.

12. The method of claim 1, comprising cooling the first turbine with another portion of the gaseous air or gaseous air components provided to the first turbine separately from the gaseous primary working fluid.

13. A method of storing and recovering energy, the method comprising:

regasifying liquid air or liquid air components to produce gaseous air or gaseous air components using heat from an exhaust gas stream from a turbine;

heating water to produce superheated steam with heat from the exhaust gas stream;

mixing some or all of the superheated steam with a first portion of the gaseous air or gaseous air components and gaseous fuel to form a mixture and combusting the mixture to form a gaseous primary working fluid at an elevated temperature;

expanding the gaseous primary working fluid through the turbine;

cooling components of the turbine with a second portion of the gaseous air or gaseous air components provided to the turbine separately from the gaseous primary working fluid;

producing electricity with a generator driven by the turbine;

condensing water vapor out of the exhaust gas stream during regasification of the liquid air or liquid air components to transfer additional heat to the liquid air or liquid air components, wherein the regasifying the liquid air or liquid air components to produce the gaseous air or gaseous air components using heat from the exhaust gas stream comprises freezing carbon dioxide out of the exhaust gas stream by transferring heat from the exhaust gas stream to at least a portion of the liquid air or liquid air components;

cooling a storage medium by transferring heat from the storage medium to the exhaust gas stream after freezing the carbon dioxide out of the exhaust gas stream; and using the cooled storage medium as a heat sink during liquefaction of the liquid air or liquid air components.

* * * * *